No. 781,550. PATENTED JAN. 31, 1905.
F. PRINZ.
MACHINE FOR GRADING CEREALS OR OTHER MATERIAL.
APPLICATION FILED JUNE 2, 1902.
2 SHEETS—SHEET 1.
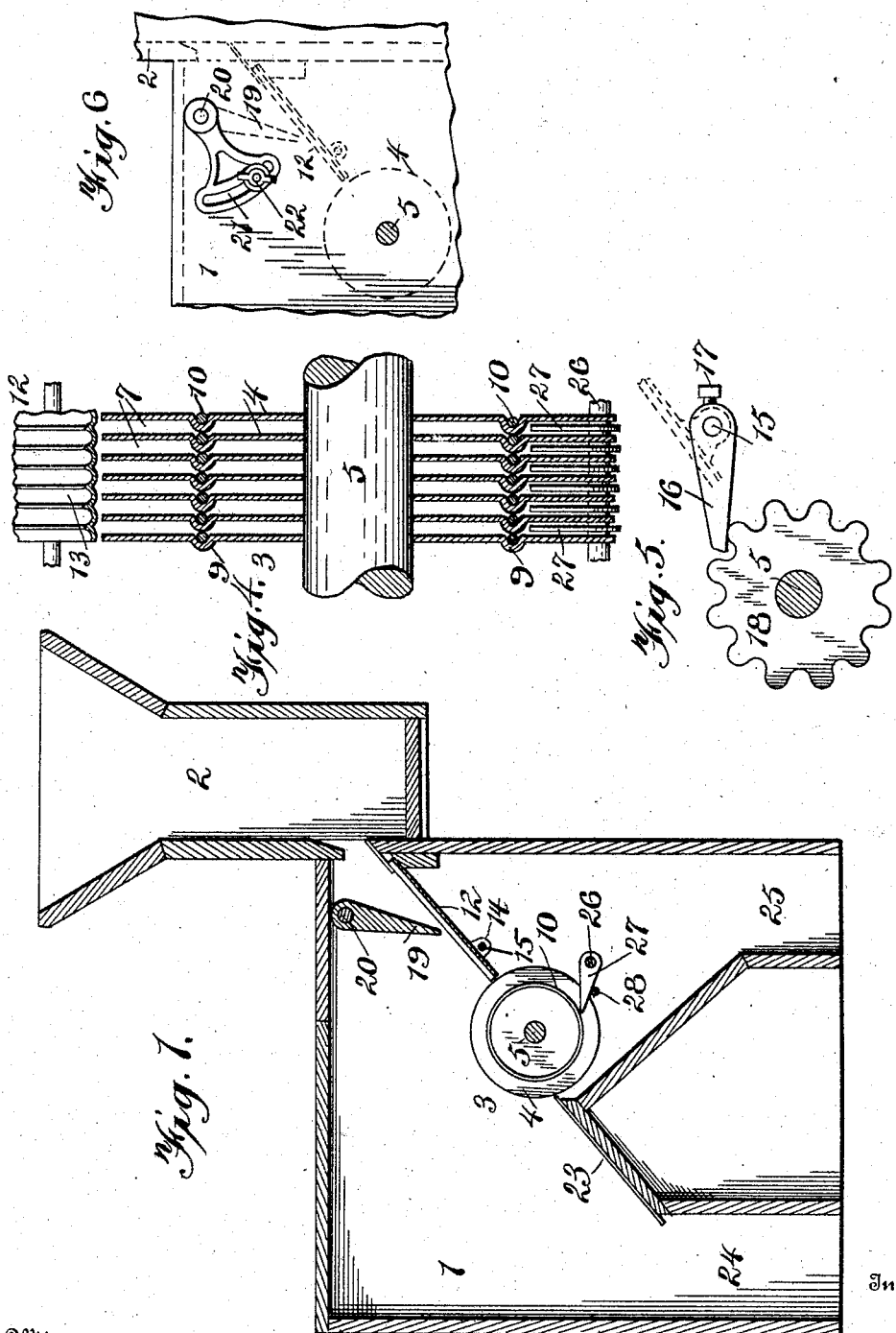

No. 781,550. PATENTED JAN. 31, 1905.
F. PRINZ.
MACHINE FOR GRADING CEREALS OR OTHER MATERIAL.
APPLICATION FILED JUNE 2, 1902.
2 SHEETS—SHEET 2.
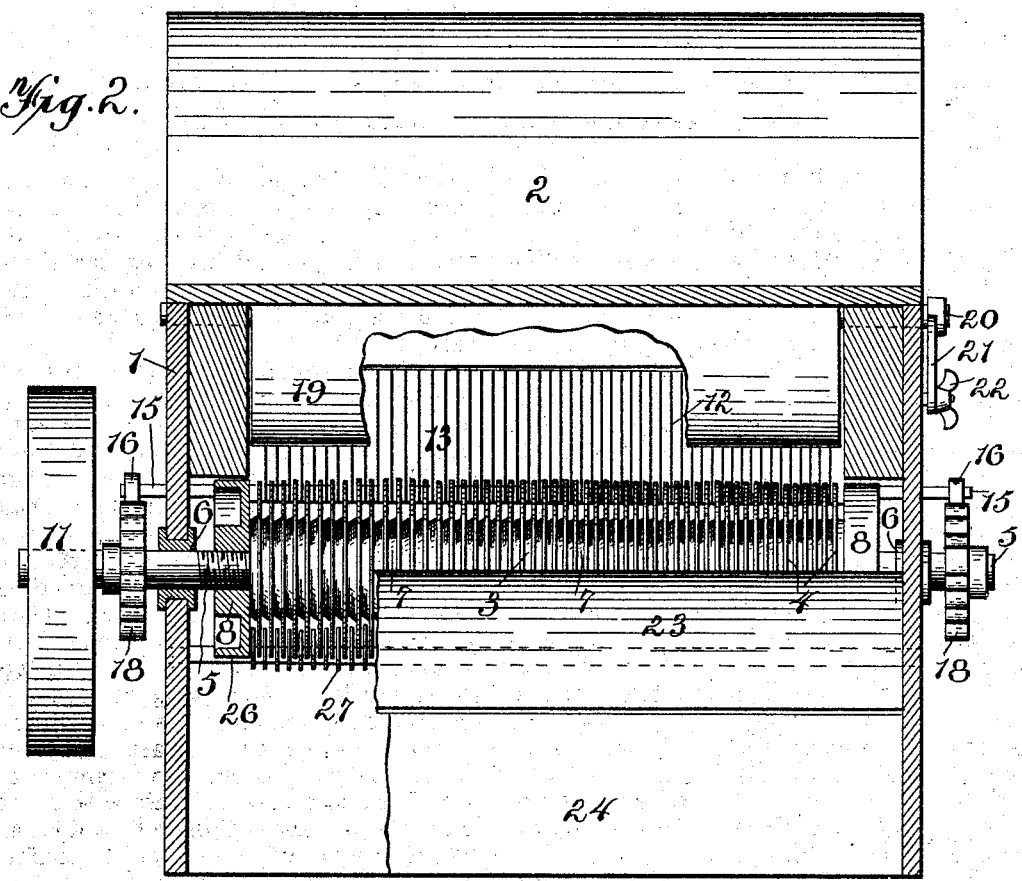
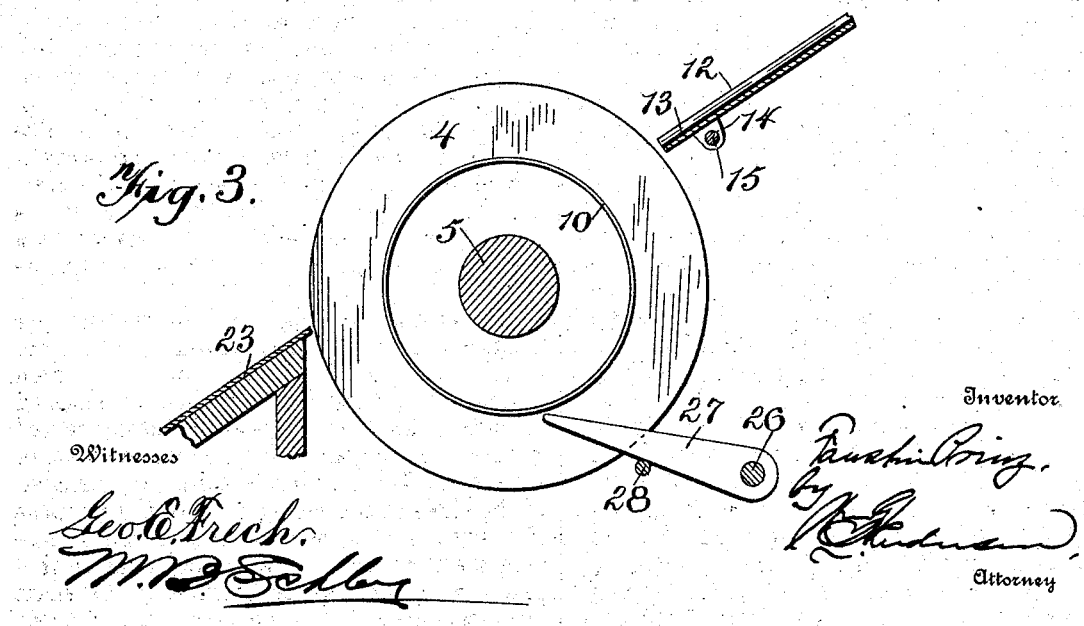

No. 781,550.

Patented January 31, 1905.

UNITED STATES PATENT OFFICE.

FAUSTIN PRINZ, OF MILWAUKEE, WISCONSIN.

MACHINE FOR GRADING CEREALS OR OTHER MATERIAL.

SPECIFICATION forming part of Letters Patent No. 781,550, dated January 31, 1905.

Application filed June 2, 1902. Serial No. 109,947.

*To all whom it may concern:*

Be it known that I, FAUSTIN PRINZ, a citizen of the United States, residing at Milwaukee, in the county of Milwaukee and State of Wisconsin, have invented certain new and useful Improvements in Machines for Grading Cereals or other Material; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a machine for grading oats, cereals of various kinds, and other material; and it has for its object to provide such a machine which will embody in its construction a grating composed of a number of disks or plates placed side by side and spaced apart to form grooves or channels into which the smaller particles of material will pass in the movement of the grating and be delivered at one point, while the larger particles will pass from the surface of the grating and be delivered at another point.

It has, further, for its object to combine with such a grating a vibratable feed apron or board for delivering the material to the grating.

It has, further, for its object to combine with such a grating means for preventing the material which enters the channels or grooves from packing in the channels and clogging up the same.

For the formation of a machine having the features specified in a simple and efficient form the invention consists in features hereinafter particularly described and then sought to be clearly defined by the claims, reference being had to the accompanying drawings, forming a part hereof, and in which—

Figure 1 is a vertical cross-section through a machine embodying features of the invention. Fig. 2 is an end elevation with certain parts broken away and others in section. Fig. 3 is a detail of the grating, the feed-apron, the delivery-board, and the comb for clearing the grooves or channels, the parts being in end elevation. Fig. 4 is a detail of the same parts with the delivery-board omitted and with parts broken away. Fig. 5 is an end view of a portion of the grating and feed apron or board and showing the pawl-and-ratchet mechanism for vibrating the feed mechanism, and Fig. 6 is a side elevation of a part of the machine.

In the drawings the numeral 1 designates a casing of any suitable form or pattern and provided with a feed-hopper 2. Within the casing is mounted a grating 3, which, as illustrated, is formed of a number of plates or disks 4, mounted upon a shaft 5, journaled in suitable boxes 6, supported by the sides of the frame, the plates or disks being spaced apart to form grooves or channels 7, extending circumferentially around the grating. The disks are secured to the shaft by means of nuts 8, screwed onto the shaft 5 and bearing against the end disks of the grating, so as to hold the disks in position and to the shaft. The disks or plates may be spaced apart by any suitable means; but for that purpose I stamp or otherwise form each disk or plate with a circular hollow bead 9, and within each bead lay a ring 10, which may be a wire bent to conform to the shape of the hollow bead. In this way the wires are prevented from dropping between the disks, and the bead of one disk which lies opposite to the wire of the adjoining disk will prevent the wire from coming out of the hollow bead. These beads also serve to stiffen the disks or plates and prevent the same from bending or warping. The grating thus formed is cylindrical in form and is rotated by suitable means—for instance, by a pulley 11, deriving power from a suitable source.

Between the grating 3 and the feed-hopper 2 there is located a feed apron or board 12, which may be of any suitable form, but which I make, preferably, with a fluted or corrugated surface 13, the apron or board being connected suitably, for instance, by a collar or bracket 14 to a shaft 15, which is suitably journaled in the sides of the casing 1. For the purpose of vibrating this feed apron or board I provide the shaft 15, at one or both ends, with a pawl 16, which may be secured to the shaft by a set-screw 17. The free ends of these pawls rest upon ratchets 18, connected to the shaft 5 of the grating, so that in the rotation of the grating the pawls will be raised and lowered and the feed apron or board thus caused to vibrate in order to better feed the material to the grating. The ratchets constitute a simple form of cam for vibrating the feed-board. By loosening the set-screw 17 and securing the same at another point to the shaft 15 it is obvious that the angle or inclination of the feed-board in relation to the grating may be changed.

Above the feed apron or board is located a regulating-valve 19, which is connected to a shaft 20, suitably journaled in the sides of the casing 1, and which valve can be held near to or farther from the surface of the feed apron or board by means of a quadrant 21 and nut 22, so as to regulate the quantity of material that may pass over the feed apron or board to the grating.

At the side of the grating 3 opposite to the feed apron or board 12 is located a delivery-board 23, which can be positioned at any height desired in relation to the grating and which serves to deliver to a hopper or chamber 24 the material which may pass from the periphery or surface of the grating onto the delivery-board. The smaller material which enters the channels or grooves in the grating is discharged into a hopper or chamber 25 below the grating, and for the purpose of preventing the smaller material from clogging the channels or grooves I provide a comb whose teeth enter the spaces or channels between the disks or plates of the grating, and thus serve as scrapers to prevent the material from clogging the spaces or channels of the grating. This comb I prefer to form of a shaft 26, suitably journaled in the sides of the casing and having secured thereto a number of fingers or teeth 27, which project into the spaces between the disks or plates which form the grating. This comb is located in the hopper or chamber 25, so that the material with its teeth dislodged from the grating will drop into the hopper or chamber, and for the purpose of preventing the teeth from dropping out of the spaces or channels I extend across the under side of the teeth a rod 28, upon which the teeth will normally rest, and which rod constitutes a stop to limit the downward movement of the teeth of the comb. Under the construction described the teeth of the comb have a slight swinging or yielding movement, so as to prevent jar or strain, and while it is preferred to have the teeth attached to their shaft, so as to turn therewith, yet if they had a movement each independent of the other or were held rigidly instead of yieldingly such alterations would be embraced within the scope of this feature of the invention.

In operation the material passes from the hopper 2 onto the feed apron or board 12 and from thence onto the periphery or surface of the grating 3, the larger material passing over the surface of the grating and in the rotation of the latter being delivered onto the delivery-board 23, from whence it falls into the chamber or hopper 24, while the smaller particles of material fall into the spaces between the disks or plates forming the grating, and by the rotation of the latter are carried below and discharged into the hopper or chamber 25, and if any of the particles entering these spaces between the disks should have a tendency to pack therein the teeth 27 of the comb will dislodge the same, so that they will fall into the chamber beneath the grating. The regulating-valve 19 is adjusted to suit the kind and conditions of material to be grated, so that the material in the proper regulated quantity will pass over the vibrating feed-board.

The machine is very efficient for the purposes for which it has been designed and it serves to rapidly and effectively grade the material, the rotation of the grating serving to facilitate materially the quick and proper grading of the material. If the material being graded be such that it is somewhat elongated in shape—for instance, if it be oats - the elongated particles will be turned lengthwise in their travel over the surface of the rotating grating, the edges of the disks forming the grating serving to turn the elongated particles lengthwise, so that a quicker and more satisfactory grading is effected.

It will be observed that under the construction described the material, large and small, is fed onto the periphery of the grading member and that the smaller particles pass into the channels, while the larger particles are retained on the periphery, and both large and small particles are carried in the same direction by the grading member, the material on the periphery sliding thereon while being carried along, so that an opportunity is afforded for the smaller particles to drop into the channels, while the larger particles will slide or move over the periphery and be discharged therefrom on the opposite side from where the material is fed to the grading member. This affords an ample opportunity for the more perfect grading of the material and avoids abrasion or injury to the grain or material.

While I have illustrated a single rotatable grating located within a casing, yet it is obvious that the number may be multiplied to the extent desired, and it is also obvious that the dimensions of the several parts may be varied without affecting the essential features of the invention, and while I have illustrated and described the preferred details of construction and arrangement of the several parts, yet it is obvious that changes may be made therein and essential features of my invention still be retained.

Having described my invention and set forth its merits, what I claim is—

1. In a machine for grading cereals and other material, a rotatable grading member composed of a number of plates placed side by side and spaced apart to form circumferentially-extending channels, and beads formed on the faces of the plates to stiffen the plates and form a grading-space between the beads and the peripheral edge of the plates, substantially as described.

2. In a machine for grading cereals and other material, a rotatable grading member composed of a number of plates spaced apart to form circumferentially-extending channels, said plates having hollow beads formed on their faces, and rings interposed between the plates and fitting in the hollow portions of the beads, substantially as described.

3. In a machine for grading cereals and other material, a rotatable grading member composed of a number of plates placed side by side and spaced apart to form circumferentially-extending channels, a vibratable feed apron or board for directing material to said grading member, means for vibrating said board, and means for changing the inclination of the feed-board, substantially as described.

4. In a machine for grading cereals and other material, a rotatable grading member composed of a shaft having a number of plates spaced apart to form circumferentially-extending channels, a shaft supporting a vibratable feed apron or board for directing material to said grading member, a cam connected with the shaft of the rotatable grading member, and a pawl carried by the shaft of the vibratable feed-board for connecting the vibratable apron with said cam whereby the apron is vibrated from the grading member, substantially as described.

5. In a machine for grading cereals and other material, a rotatable grading member composed of a number of plates placed side by side and spaced apart to form circumferentially-extending channels, and a comb the teeth of which lie loosely in the spaces between the plates composing the grading member, substantially as described.

6. In a machine for grading cereals and other material, a rotatable grading member composed of a number of plates placed side by side and spaced apart to form circumferentially-extending channels, a comb the teeth of which lie loosely in the spaces between the plates composing the grading member, and a stop for limiting the downward movement of the teeth of the comb, substantially as described.

7. In a machine for grading cereals and other material, a rotatable grading member composed of a number of plates spaced apart to form circumferentially-extending channels, a vibratable feed apron or board for directing material to the grading member, and an adjustable feed-valve located above the apron or feed-board for regulating the flow of the material over the feed apron or board, substantially as described.

8. A grading machine for cereals and other material, comprising a rotatable grading member composed of a number of plates placed side by side and spaced apart to form circumferentially-extending channels, a feed apron or board for directing the material to the grading member, a discharge feed-board located on the side of the grading member opposite to the feed apron or board, a valve for regulating the flow of material over the feed apron or board, and a comb located in a chamber beneath the grading member and having its teeth lying in the spaces between the plates composing the grading member, substantially as described.

In testimony whereof I affix my signature in presence of two witnesses.

FAUSTIN PRINZ.

Witnesses:
W. F. FILTER,
GUHARD G. FISCHER.